United States Patent
Kunito

[19]

[11] Patent Number: 6,075,786
[45] Date of Patent: Jun. 13, 2000

[54] ATM EXCHANGE APPARATUS AND METHOD OF SAME

[75] Inventor: Yoshiyuki Kunito, Kanagawa, Japan

[73] Assignee: Sony Corporation, Tokyo, Japan

[21] Appl. No.: 08/882,832

[22] Filed: Jun. 26, 1997

[30] Foreign Application Priority Data

Jul. 3, 1996 [JP] Japan .................................. 8-173598

[51] Int. Cl.⁷ .................................................. H04L 12/56
[52] U.S. Cl. .................................... 370/389; 370/397
[58] Field of Search ................................. 370/389, 392, 370/395, 397, 399, 410

[56] References Cited

U.S. PATENT DOCUMENTS

| | | | |
|---|---|---|---|
| 5,774,465 | 6/1998 | Lau et al. | 370/395 |
| 5,812,550 | 9/1998 | Sohn et al. | 370/395 |

*Primary Examiner*—Chi H. Pham
*Assistant Examiner*—Maikhanh Tran
*Attorney, Agent, or Firm*—Jay H. Maioli

[57] ABSTRACT

An ATM (asynchronous transfer mode) exchange apparatus which processes data transmitted in units of ATM cells over a communication line based on an ATM system, include a control data adding circuit for adding predetermined control data at the position of header error control data included in a header region of each of the ATM cells and an exchange processing circuit for carrying out exchange processing with respect to an ATM cell transmitted based on the control data.

12 Claims, 13 Drawing Sheets

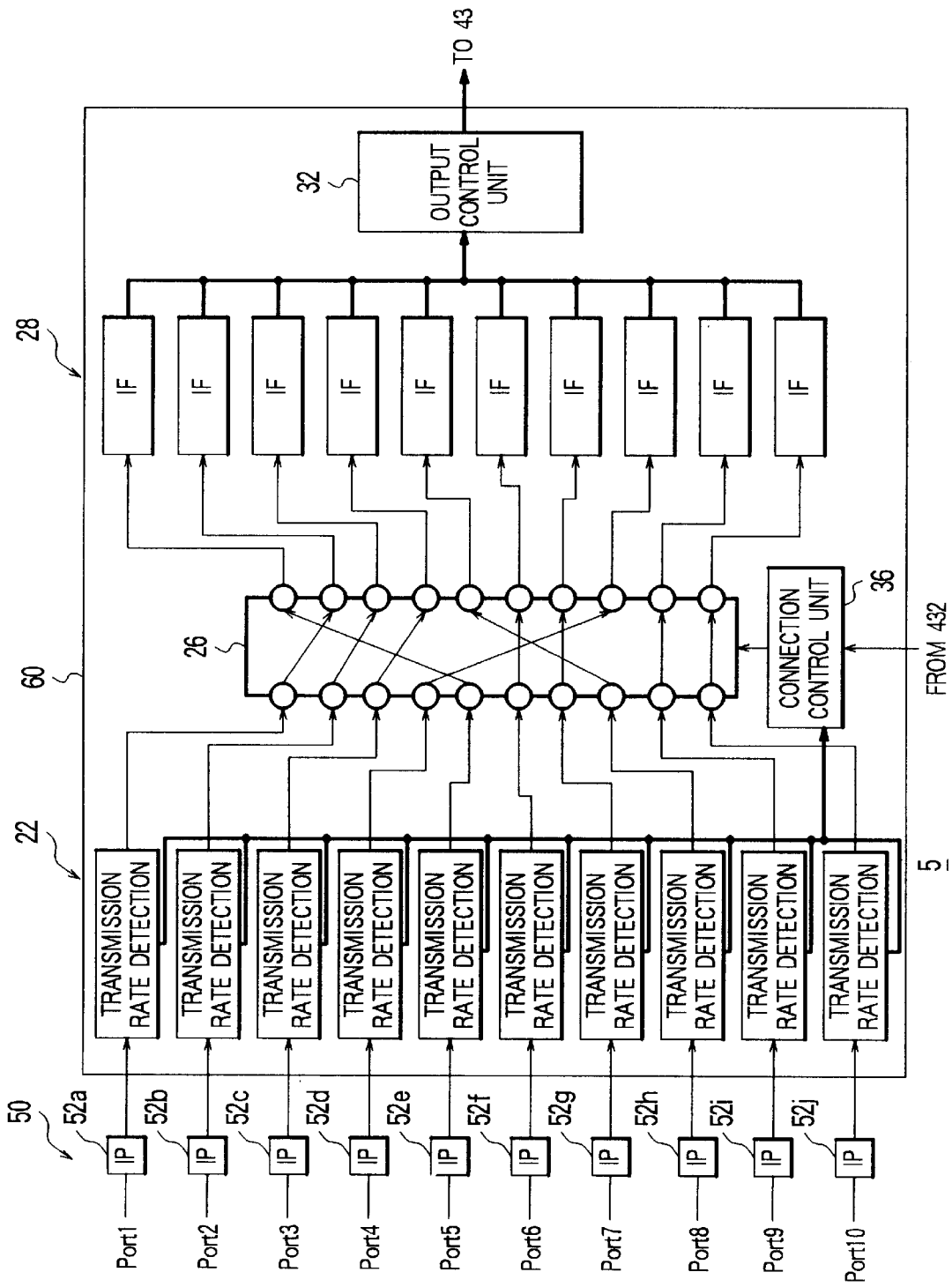

ATM EXCHANGE APPARATUS AND METHOD OF SAME

BACKGROUND OF THE INVENTION

1. Field of the Invention

The present invention relates to an ATM exchange apparatus and to an ATM exchange method in the ATM exchange apparatus.

2. Description of the Related Art

One communication system for accommodating a plurality of types of data such as video data, audio data, and information processing data in a predetermined packet and exchanging and transmitting them together is the asynchronous transfer mode (ATM) system. Use of this ATM system for the connection of an information network for transmitting multimedia information and the plurality of multimedia apparatuses in the general home via an inexpensive ATM system exchange (ATM exchange) introduced into each home and provision of sophisticated multimedia information services is being considered.

In the ATM system, the data is transmitted in units of 53 byte ATM cells. (as mention later by referring to FIG. 8) Internal processing such as exchange processing is frequently carried out in units of ATM calls as well. Here, in the ATM exchange, for example, when adding an identifier of the input port to an ATM cell so as to notify the routing processing unit of the ATM exchange of the input port receiving the ATM cell or when adding an identifier for the congestion control and priority control to the ATM cell so as to notify it of the ATM cell covered by this control, it sometimes becomes necessary to serially add control data between the ATM cells.

Also, when carrying out real time high speed exchange processing, for example an exchange of ATM cells accommodating video data, there are cases where the ATM exchange is required to continuously process the ATM cells.

However, there is a disadvantage that if control data is further serially added to a train of ATM cells, the data will become too long in length, so the processing will become difficult or excessive time will become necessary for the processing.

For example, as a method for compensating for the excessive processing time caused due to the addition of the control data to the train of the ATM cells, the method of raising the frequency of the clock of the ATM exchange or increasing the bus width can be considered, but when this method is adopted, there arise disadvantages that the process of production of the LSI used in the processing apparatus becomes difficult, the size of the LSI becomes large, etc.

Further, for example, in internal processing of an LSI, provision of a register for storing the control data enables the addition of the control data to the train of ATM cells to be avoided. Accordingly, in actuality, it becomes necessary to insert the control data into the ATM cells in only part of the processing of the ATM exchange such as the transfer of data between LSI's or storage of the ATM cells in the memory. That is, since the insertion of the control data into the train of ATM cells becomes necessary in part of the processing of the ATM exchange, this leads to a reduction of the processing capability of the ATM exchange as a whole.

SUMMARY OF THE INVENTION

An object of the present invention is to provide an ATM exchange apparatus and a method of same with which the routing processing, the congestion control and priority control processing, etc. can be carried out without the addition of the control data to the train of continuous ATM cells and in addition these processings can be carried out easily and at a high speed.

Further, another object of the present invention is to provide an ATM exchange apparatus and a method of same with which it is not necessary to raise the frequency of the clock of the ATM exchange and increase the bus width even in a case where ATM cells containing the data for which real time and high speed exchange processing is required such as video data are to be exchanged.

Further, another object of the present invention is to provide an ATM exchange apparatus and a method of same with which the processing capability of the entire ATM exchange is not lowered due to the processing in part of the ATM exchange.

To achieve the above objects, there is provided an ATM exchange apparatus comprising a control data adding means for adding predetermined control data at the position of header error control data included in a header region of each of the ATM cells and an exchange processing means for carrying out exchange processing with respect to an ATM cell transmitted based on the control data.

Preferably, the ATM cells are input from a plurality of input ports and the control data adding means adds an input port identifier indicating the input port from which a cell was input at the position of the header error control data as the predetermined control data.

Further, an ATM exchange apparatus of the present invention comprises a translation memory in which are entered virtual path identifiers and virtual channel identifiers, new virtual path identifiers and new virtual channel identifiers, and routing information in corresponding sets and carries out translation processing using the translation memory referring to the virtual path identifier, virtual channel identifier, and input port identifier included at the position of the header error control data of the input ATM cell.

Further, the exchange processing means comprises a routing means for routing an ATM cell to an output port based on an address included in the header region of the ATM cell and the input port identifier added as the header error control data.

Further, an ATM exchange apparatus of the present invention comprises an output port control data adding means for adding to each of the routed ATM cells an output port identifier indicating the output port for outputting the ATM cell as the header error control data of the ATM cell, and an ATM cell exchanging means for exchanging each of the ATM cells and outputting the same from the output port indicated by the output port identifier based on the output port identifier added as the header error control data of the ATM cell.

Specifically, the address is a virtual path identifier and virtual channel identifier and a new virtual path identifier and new virtual channel identifier.

Further, the control data adding means adds to each of the ATM cells input from the plurality of input ports a predetermined identifier used for congestion processing and priority processing or one of the same as the header error control data and the exchange processing means further comprises a congestion and priority processing means for carrying out the congestion processing and priority processing or one of the same with respect to the routed ATM cell based on the identifier added to the header error control data.

Further, to achieve the above objects, there is provided an ATM exchange method of processing data transmitted in units of ATM cells over a communication line based on an ATM system, including the steps of adding predetermined control data at the position of header error control data included in a header region of each of the ATM cells and carrying out exchange processing with respect to an ATM cell transmitted based on the control data.

Preferably, the ATM cells are input from a plurality of input ports and an input port identifier indicating the input port from which a cell was input is added at the position of the header error control data as the predetermined control data.

Further, the ATM exchange method of the present invention uses a translation memory in which are entered virtual path identifiers and virtual channel identifiers, new virtual path identifiers and new virtual channel identifiers, and routing information in corresponding sets and translation processing is carried out using the translation memory referring to the virtual path identifier, virtual channel identifier, and input port identifier included at the position of the header error control data of the input ATM cell.

Preferably, the exchange processing comprises processing for routing an ATM cell to an output port based on an address included in the header region of the ATM cell and the input port identifier added as the header error control data.

Preferably, the ATM exchange method of the present invention further include the steps of adding to each of the routed ATM cells an output port identifier indicating the output port for outputting the ATM cell as the header error control data of the ATM cell, and exchanging each of the ATM cells and outputting the same from the output port indicated by the output port identifier based on the output port identifier added as the header error control data of the ATM cell.

Specifically, the address is a virtual path identifier and virtual channel identifier and a new virtual path identifier and new virtual channel identifier.

Preferably, the ATM exchange method of the present invention further include the steps of adding to each of the ATM cells input from the plurality of input ports a predetermined identifier used for congestion processing and priority processing or one of the same as the header error control data and carrying out the congestion processing and priority processing or one of the same with respect to the routed ATM cell based on the predetermined identifier added to the header error control data.

BRIEF DESCRIPTION OF THE DRAWINGS

These and other objects and features of the present invention will become more apparent by the following description of the preferred embodiments given with reference to the attached drawings, wherein

FIG. 13 is a view of a modification of the ATM exchange according to the present invention.

DESCRIPTION OF THE PREFERRED EMBODIMENTS

Below, a first embodiment of the present invention will be explained.

Figure 1:
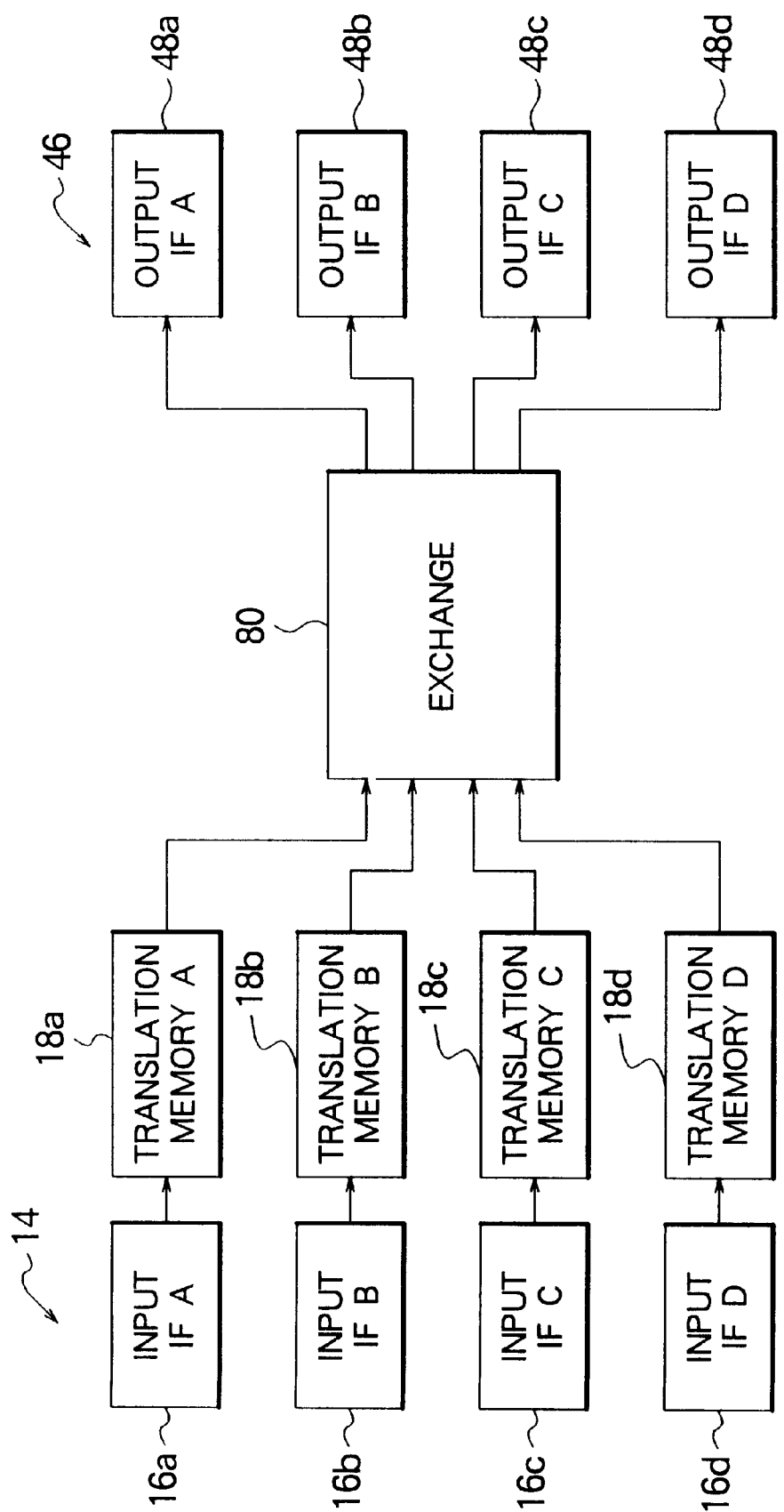
FIG. 1 is a view of the configuration of an ATM exchange according to a first embodiment of the present invention.

FIG. 1 is a view of the configuration of an ATM exchange 1 according to the first embodiment of the present invention.

As shown in FIG. 1, the ATM exchange 1 is constituted by an input port unit 14, an exchange unit 80, and an output port unit 46, the input port unit 14 is constituted by input interfaces 16a to 16d (input IF-A to IF-D) and translation memories 18a to 18d provided corresponding to the input interfaces 16a to 16d, and the output port unit 46 is constituted by output interfaces 48a to 48d (output IF-A to IF-D).

The ATM exchange 1 routes the ATM cells input to the input interfaces 16a to 16d of the input port unit 14 by these constituent parts, exchanges them, and outputs the same from the output interfaces 48a to 48d.

In the ATM exchange 1, the input interfaces 16a to 16d of the input port unit 14 respectively receive the ATM cells input from a communication line (not illustrated) of the ATM system and output the same to the translation memories 18a to 18d.

Figure 2:
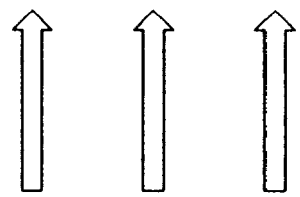
FIG. 2 is a view of the correspondence between a VPI/VCI and VPI'/VCI' to be entered in a translation memory shown in FIG. 1.

In each of the translation memories 18a to 18d, as shown in FIG. 2, a set of the virtual path identifier/virtual channel identifier (VPI/VCI) set by the call set-up and the new virtual path identifier/virtual channel identifier (VPI'/VCI') and the routing information is stored (entered) in the form of a table.

Figure 3:
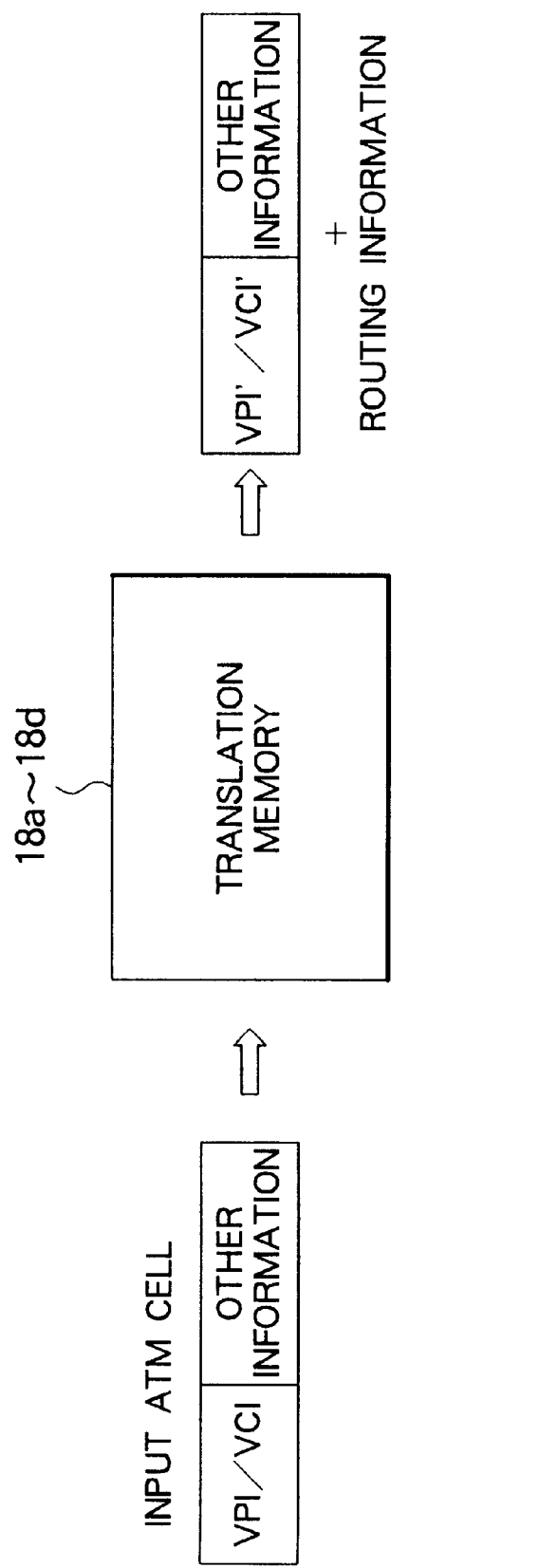
FIG. 3 is a view of the processing for replacement of the VPI'/VCI' and the VPI/VCI by the translation memory shown in FIG. 1.

The translation memories 18a to 18d respectively refer to the addresses (VPI/VCI) contained in the headers of the ATM cells input from the input interfaces 16a to 16d and carry out the translation processing. That is, each of the translation memories 18a to 18d searches through the table based on the VPI/VCI and, as shown in FIG. 3, uses the VPI'/VCI' newly obtained as a result of the search to replace the original VPI/VCI of the ATM cell, adds the routing information to the ATM cell, and outputs the same to the exchange unit 80.

The exchange unit 80 outputs the ATM cells input from the translation memories 18a to 18d via the output interfaces 48a to 48d indicated by the routing information.

Below, a second embodiment of the present invention will be explained.

Figure 4:
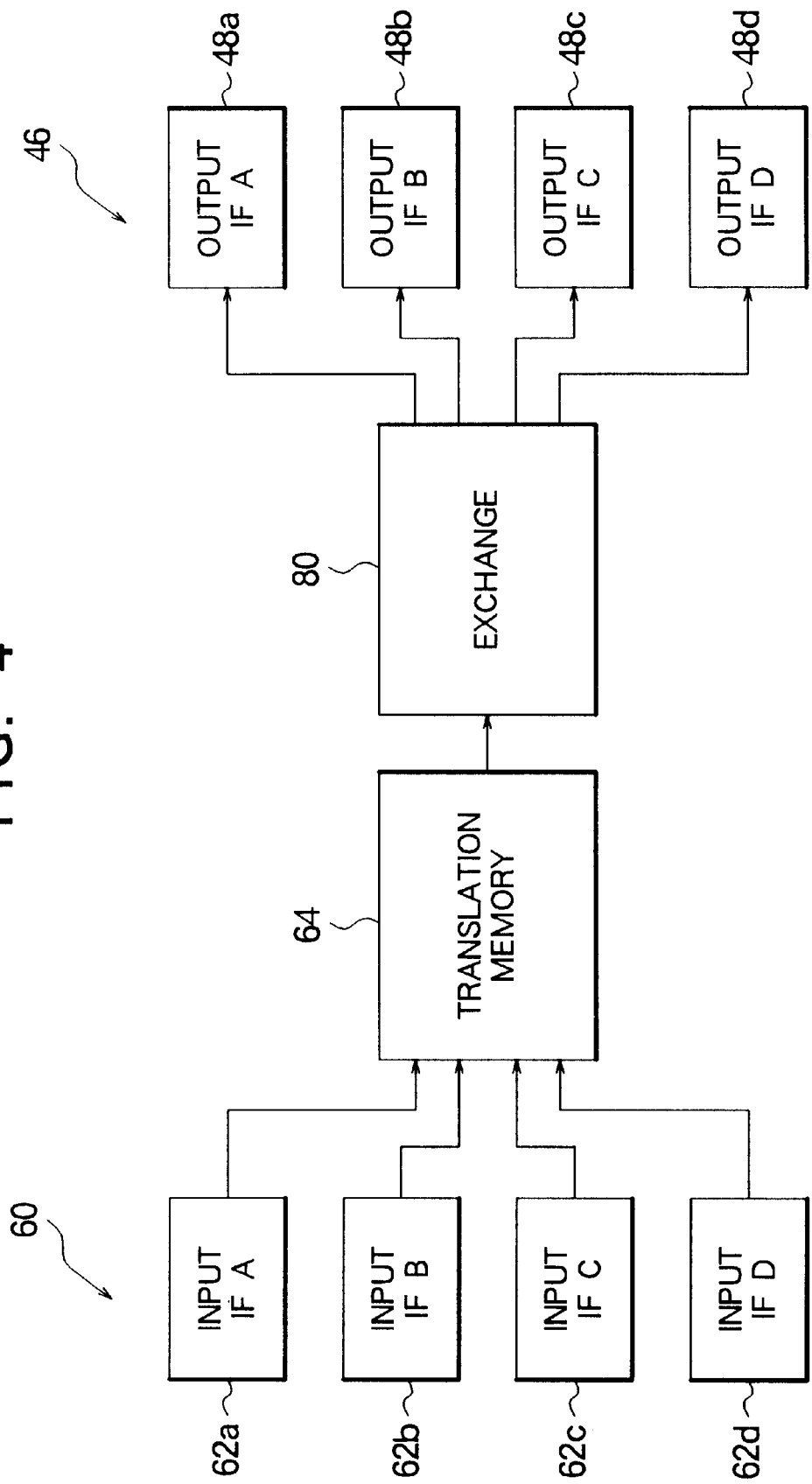
FIG. 4 is a view of the configuration of an ATM exchange according to a second embodiment of the present invention.

FIG. 4 is a view of the configuration of the ATM exchange 2 according to the second embodiment of the present invention. Note that, in FIG. 4, the same references are given to the same constituent parts as those of the ATM exchange 1 (FIG. 1).

The translation memories 18a to 18d of the ATM exchange 1 (FIG. 1) shown in the first embodiment are constituted by using special memory elements having a VPI/VCI comparison function, so are expensive. Further, in a large scale ATM exchange, the storage capacity of each of the translation memories must be sufficiently large, but, for example, in a small capacity, small sized ATM exchange to be introduced into the home, a large memory capacity of each of the translation memories is not necessary. Rather, the number of connections of the ATM exchange as a whole becomes the disadvantage in the exchange processing.

For example, in a small capacity, small sized ATM exchange, the number of connections set as a whole is 256 at the maximum, but when a maximum of 128 connections are set for every input port, each of the translation memories 18a to 18d in the ATM exchange 1 must have 128 connections worth of capacity and 256 (=128×4−256) connections worth of storage capacity becomes useless in the ATM exchange 1 as a whole.

From such a viewpoint, the ATM exchange 2 explained in the second embodiment improves on the ATM exchange 1 shown in the first embodiment by providing common translation memories for the input ports so as to reduce the storage capacity and the number thereof thereby eliminating waste and enabling efficient exchange processing and, in addition, enabling production of a small size, inexpensive exchange.

As shown in FIG. 4, the ATM exchange 2 is constituted by an input port unit 60, a translation memory 64, an exchange unit 80, and an output port unit 46, and the input port unit 60 is constituted by input interfaces 62a to 62d.

Each of the input interfaces 62a to 62d of the input port unit 60 receives the ATM cell inputs from a communication line (not illustrated) of the ATM system and adds an input port identifier indicating the input port to each of the received ATM's at for example the position of the header error control information (HEC) of the header of the ATM cell.

Figure 5:
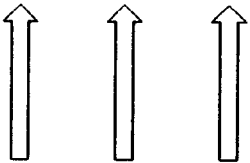
FIG. 5 is a view of the correspondence of the VPI/VCI and input port identifier and the VPI'/VCI' and routing information to be entered in the translation memory shown in FIG. 4.

In the translation memory 64, as shown in FIG. 5, a table of correspondence of the VPI/VCI of the connection set by the call set-up and the input port identifier and the VPI'/VCI' and the routing information is entered.

The translation memory 64 refers to the VPI/VCI and input port identifiers contained in the headers of the ATM cells input from the input interfaces 62a to 62d to carry out the translation processing. That is, the translation memory 64 searches through the table based on the VPI/VCI and input port identifier, uses the VPI'/VCI' newly obtained as a result of the search to replace the original VPI/VCI, and further adds the routing information as the user information to the ATM cell and outputs the same to the exchange unit 80.

By constituting the ATM exchange 2 as explained above, the capacity and number of the translation memories can be reduced. Concretely explaining this based on the above example, when the number of the connections set by the whole ATM exchange 2 is 256 at the maximum, even in a case where a maximum of 128 connections are set for each of the input ports, it is sufficient so far as the translation memory 64 has 256 connections worth of capacity. Accordingly, the waste of 256 connections worth of storage capacity caused in the ATM exchange 1 (FIG. 1) is eliminated.

Note that, in the ATM exchange 2, the number of the input ports and output ports is not limited to four and the number of the input ports and the number of the output ports do not have to be the same.

Further, the transmission rates of the ATM cells input and output by the input port and output port may be different.

Further, the present invention can be widely applied to an ATM exchange having a configuration other than the configuration shown in FIG. 4 which carrier out routing of ATM cells referring to a translation memory.

Below, the detailed configuration and operation of the ATM exchange according to the present invention will be explained as a third embodiment of the present invention.

Figure 6:
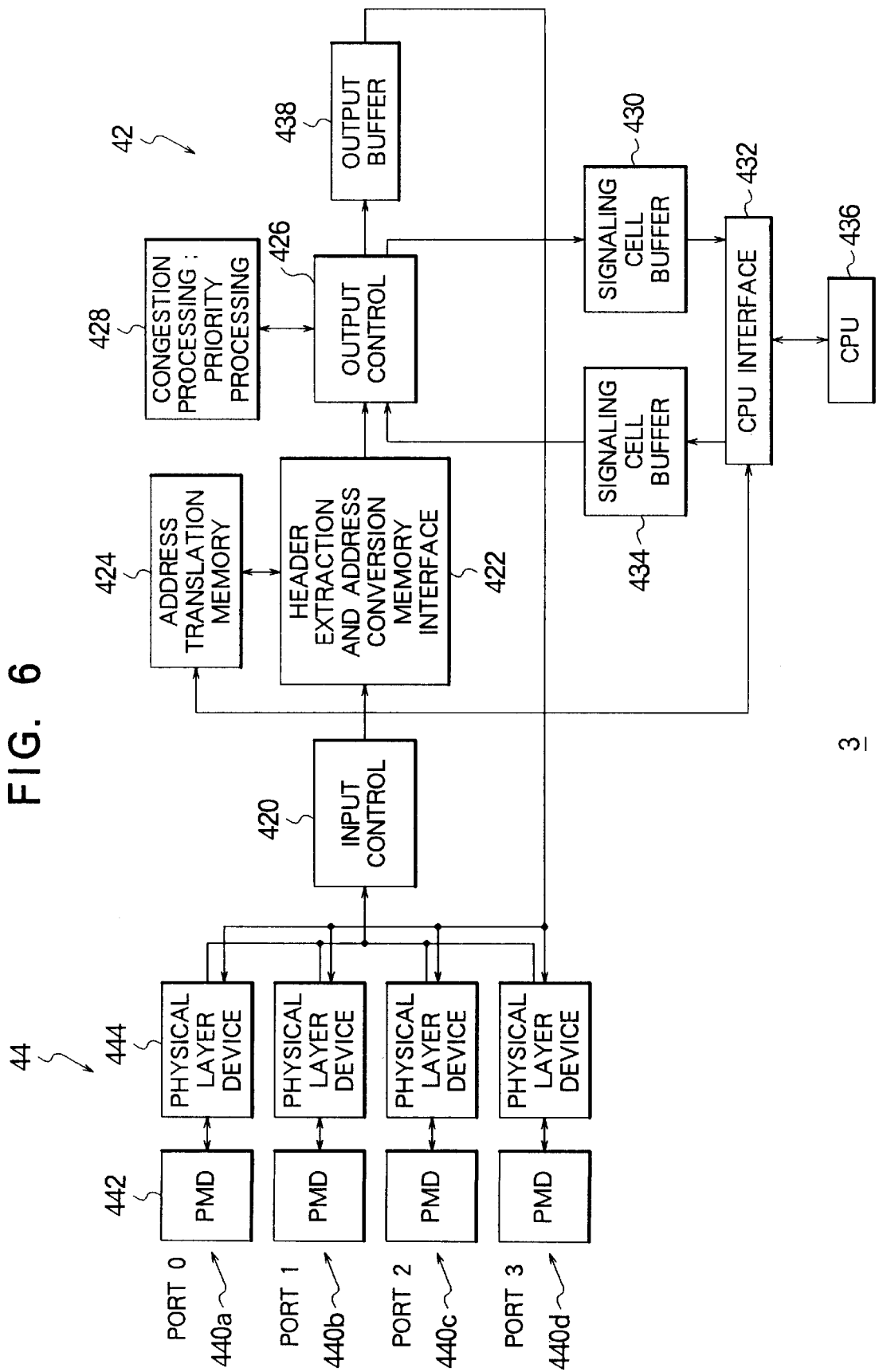
FIG. 6 is a view of the configuration of an ATM exchange according to a third embodiment of the present invention.

FIG. 6 is a view of the configuration of the ATM exchange 3 according to the third embodiment of the present invention. Note that, in FIG. 6, the same references are given to the same constituent parts as those of the ATM exchanges 1 and 2 (FIGS. 1 and 4).

As shown in FIG. 6, the ATM exchange 3 is constituted by an exchange unit 42 and an input/output unit 44 integrally constituted by the input port unit 60 and the output port unit 46 of the ATM exchange 2 (FIG. 4) shown in the second embodiment.

The input/output port unit 44 is constituted by input/output interfaces 440a to 440d, and each of the input/output interfaces 440a to 440d is constituted by a physical media device (PMD) 442 and a physical layer device 444. Note that, in FIG. 6, the reference numerals of the physical media device 442 and the physical layer device 444 of the input/output interfaces 440b to 440d are omitted for simplification of the illustration.

The exchange unit 42 is constituted by an input control unit 420, a header extraction and address conversion memory interface unit 422, an address translation memory unit 424, an output control unit 426, a congestion processing and priority processing unit 428, signaling cell buffers 430 and 434, a CPU interface 432, a control unit 436 constituted by a microprocessor (CPU), a memory, and peripheral circuits of the same, and an output buffer 438.

The ATM exchange 3 carries out the exchange processing of the ATM cells between the terminal equipment (communication nodes) connected to the input/output port unit 44 by these constituent parts in the same way as the ATM exchange 2 (FIG. 4).

The constituent parts of the ATM exchange 3 will be explained below.

In each of the input/output interfaces 440a to 440d of the input/output port unit 44, the physical media device 442 has connected to it, for example, ATM system terminal equipment (ATM terminals) having transmission rates of 25.6 Mbps, 52 Mbps, and 155 Mbps via predetermined communication media such as an unshielded twisted pair cable (UTP).

The physical media device 442 reproduces the ATM cells from the transmission signal input from the connected terminal equipment and outputs the same to the physical layer device 444. Further, the physical media device 442 converts the ATM cells input from the physical layer device 444 to a transmission signal suited to the communication medium and transmits the same.

The physical layer device 444 carries out the input/output processing with respect to the ATM cells input and output between the exchange unit 42 and the physical media device 442. That is, the physical layer device 444 extracts the ATM cells from the bit stream input from the physical media device 442, carries out parallel conversion, and outputs the result to the input control unit 420 of the input/output port unit 44. Further, the physical layer device 444 demultiplexes the multiplexed ATM cells input from the output buffer 438, carries out the parallel/serial conversion, and outputs the result to the physical media device 442.

In the exchange unit 42, the input/output control unit 420 buffers the ATM cells input from the physical layer device 444 of the input/output port unit 44, adds an input port identifier indicating from which of the input/output interfaces 440a to 440d (input/output ports) a buffered ATM cell was received from to the position of the header error control information (HEC) of the header of the ATM cell as the user information and outputs the result to the header extraction and address conversion memory interface unit 422.

The header extraction and address conversion memory interface unit 422 extracts the virtual path identifier (VPI), the virtual channel identifier (VCI), and the input port identifier contained in the header part of the ATM cell input from the input control unit 420 and outputs the same to the address translation memory unit 424. Further, the header extraction and address conversion memory interface unit 422 uses the new virtual path identifier and the virtual channel identifier (VPI'/VCI') input from the address translation memory unit 424 to replace the original VPI/VCI and further adds the routing information (FIG. 5) indicating which of the input/output interfaces 440a to 440d is to output an ATM cell and an identifier of congestion control and priority control etc. to the position of the header of the ATM cell and outputs the result to the output control unit 426.

The address translation memory unit 424 carries out the routing processing of the ATM cells corresponding to the translation memory 64 of the ATM exchange 2 (FIG. 4). That is, the address translation memory unit 424 translates the VPI/VCI by searching through the table (FIG. 5) of correspondence of the VPI/VCI and input port identifier and the VPI'/VCI' and routing information entered for every connection based on the VPI/VCI and input port identifier input from the header extraction and address conversion memory interface unit 422, generates a new virtual path identifier and virtual channel identifier (VPI'/VCI') and routing information, and outputs the same to the header extraction and address conversion memory interface unit 422.

Further, the addition of a new conversion table and deletion and updating with respect to the address translation memory unit 424 are carried out in accordance with the call set-up by the control unit 436 via the CPU interface 432.

Note that, where a signaling cell used for the call set-up processing is input from the input/output control unit 20 (see FIG. 10) the address translation memory unit 424 generates the VPI'/VCI' so that the signaling cell is routed in the signaling cell buffer 430.

The output control unit 426 carries out the exchange processing by allocating the ATM cells input from the header extraction and address conversion memory interface unit 422 to the input/output interfaces 440a to 440d based on the routing information contained at the position of the HEC. Further, the output control unit 426 carries out the priority control and congestion control based on the identifier added to the ATM cells and outputs the result to the input control unit 420 of the input/output control unit 20 (see FIG. 10) via the output buffer 438.

Note that, when the signaling cell for call set-up processing is input from the header extraction and address conversion memory interface unit 422, the output control unit 426 outputs the signaling cell to the control unit 436 via the signaling cell buffer 430 and the CPU interface 432.

The control unit 436 carries out the addition, deletion, and updating of the storage contents (entries) of the address translation memory unit 424 based on the call set-up information contained in the signaling cell input via the signaling cell buffer 430 and the CPU interface 432.

Further, the control unit 436 generates the signaling cell for call set-up according to need and outputs the same to the output control unit 426 via the CPU interface 432 and the signaling cell buffer 434.

Below, the operation of the ATM exchange 3 will be explained.

Whenever there is a call set-up request and an ending request from the ATM terminals connected to the input/output interfaces 440a to 440d of the input/output port unit 44 (FIG. 6), the control unit 436 of the exchange unit 42 carries out the call set-up processing and carries out the addition and updating of the entry (FIG. 5) of the address translation memory unit 424.

Each of the input/output interfaces 440a to 440d receives the ATM cells from the ATM terminals and outputs the same to the exchange unit 42.

In the exchange unit 42, the input control unit 420 buffers the ATM cells input from the input/output interfaces 440a to 440d and further adds the input port identifiers to the position of the user information of the ATM cells.

The header extraction and address conversion memory interface unit 422 extracts the VPI/VCI and input port identifier of each of the ATM cells and outputs the same to the address translation memory unit 424.

The address translation memory unit 424 searches through the table (FIG. 5) based on the VPI/VCI and the input port identifier input from the header extraction and address conversion memory interface unit 422 to further generate the VPI'/VCI' and routing information.

The output control unit 426 allocates the ATM cells to the input/output interfaces 440a to 440d based on the routing information contained in the HEC and outputs the same to the input/output interfaces 440a to 440d via the output buffer 438.

The input/output interfaces 440a to 440d output the ATM cells input from the output control unit 426 to the ATM terminals.

By constituting the ATM exchange 3 as explained above, in the same way as the ATM exchange 2 (FIG. 4) shown in the second embodiment, the capacity and number of the translation memories can be reduced. Accordingly, the ATM exchange 3 can be cheaply produced making it suitable as a small capacity ATM exchange for the home.

Further, the exchange method in the ATM exchange 3 can be applied to other exchange systems carrying out the exchange processing by using translation memories in the same way as the ATM system, for example, a packet exchange system using translation memories.

Further, the ATM exchange 3 can be constituted by separating the input ports and output ports similar to the ATM exchange 2 (FIG. 4). Further, the same modifications as those with respect to the ATM exchange 2 are possible.

Below, a fourth embodiment of the present invention will be explained.

Figure 7:
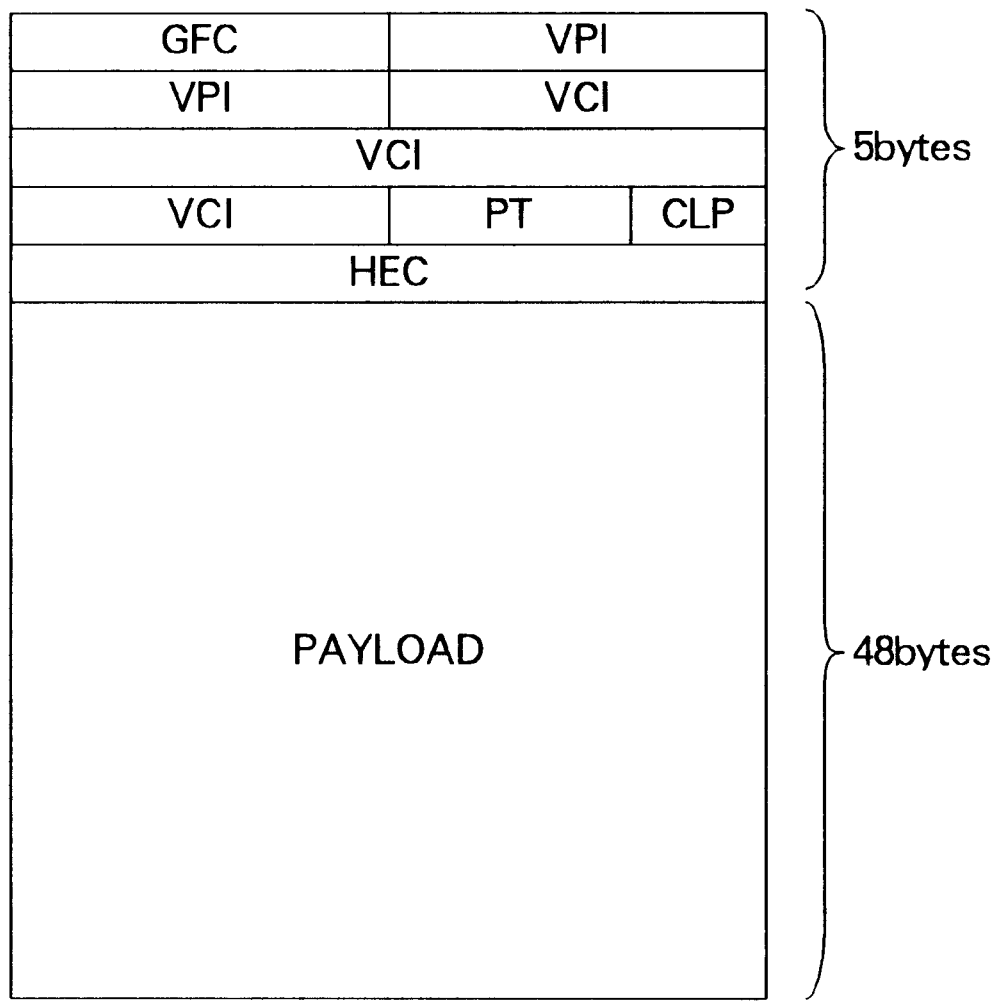
FIG. 7 is a view of the configuration of an ATM cell.

FIG. 7 is a view of the configuration of an ATM cell.

As shown in FIG. 7, an ATM cell is comprised of 53 bytes. The first 5 bytes are used as the header, the subsequent 48 bytes are used as the payload, and the fifth byte of the header is used as the data for header error control (HEC).

The HEC usually contains a 1-byte CRC (circulation redundant code) which is used for the error control of the other header data and the specification of the position of the ATM cell in the data train.

However, inside the ATM exchange, particularly inside the LSI used in the ATM exchange, the probability of an occurrence of error in the header data can be de facto ignored. Further, the position of the ATM cell in the data train is specified. Accordingly, in actuality, inside the ATM exchange, the HEC is not used in many cases.

As in the ATM exchanges 2 and 3 (FIG. 4 and FIG. 6) shown in the second embodiment and the third embodiment, where translation memories are commonly provided with respect to the input ports, it is necessary to input the ATM cells and input port identifiers into the translation memories in order to search through the table of correspondence of the VPI/VCI and input port identifier and the VPI'/VCI' and routing information for every connection.

Figure 8:
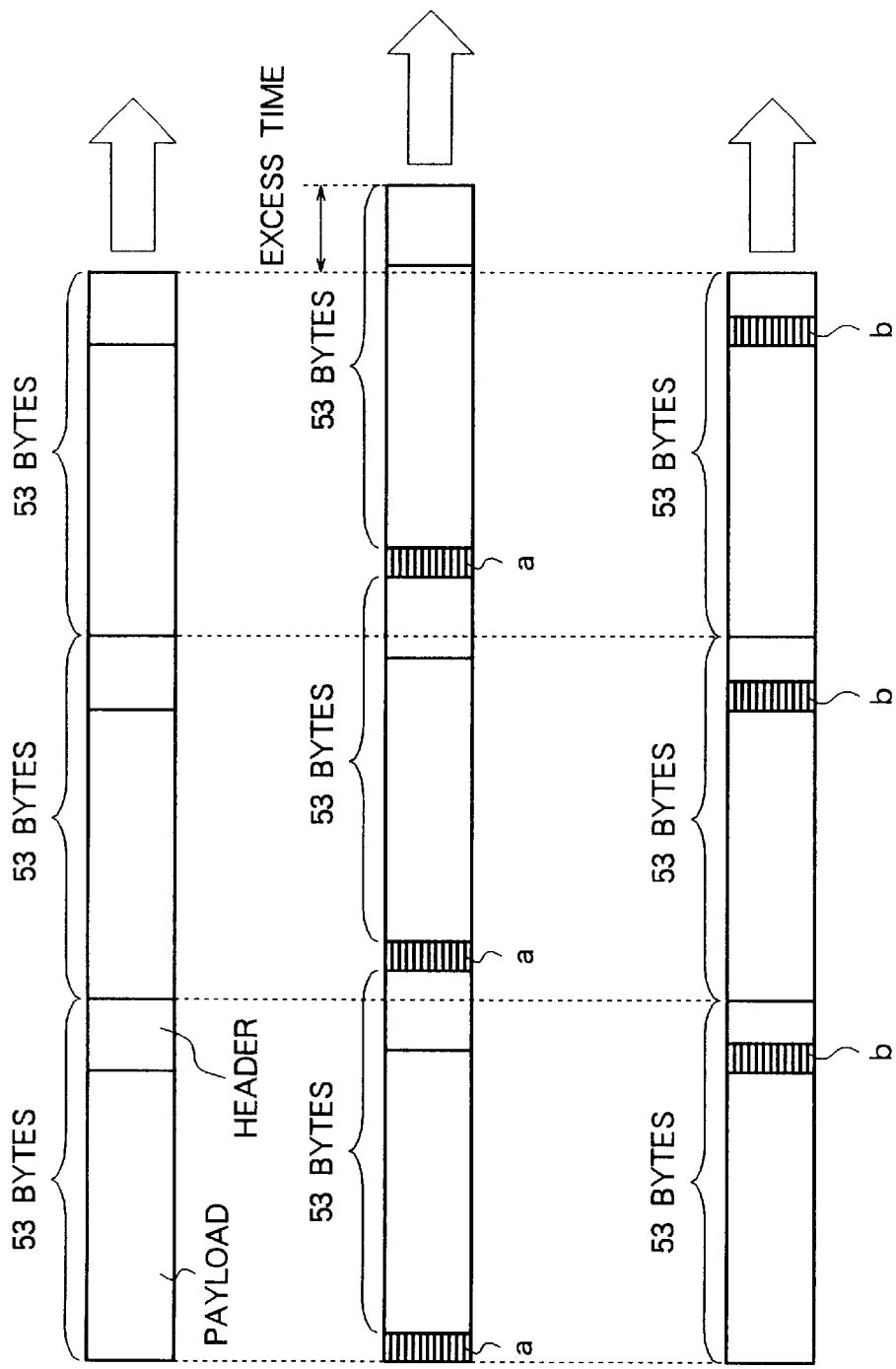
FIG. 8A to FIG. 8C are views of continuous ATM cells and a method for adding control data to an ATM cell.

In this case, if control data (input port identifier) is inserted between the continuous ATM cells shown in FIG. 8A as indicated by a symbol "a" in FIG. 8B, the data becomes long in length and in addition excessive time is required for the processing. Such a disadvantage similarly arises in the case where an identifier for the congestion control and priority control is inserted into the train of the ATM cells.

Below, in the fourth embodiment, an explanation will be made of a modification of the ATM exchange 3 in which the disadvantages caused when the control data is inserted into the train of the continuous ATM cells (FIG. 8B) are prevented by adding the input port identifier and congestion control and priority control use identifier etc. to the ATM cell as the HEC.

Whenever there is a call set-up request, ending request, etc. from the ATM terminals connected to the input/output interfaces 440a to 440d of the input/output port unit 44 (FIG. 6), the control unit 436 of the exchange unit 42 carries out the call set-up processing and carries out the addition and updating of the entries (FIG. 5) in the address translation memory unit 424.

Each of the input/output interfaces 440a to 440d receives the ATM cells from the ATM terminal and outputs the same to the exchange unit 42.

In the exchange unit 42, the input control unit 420 buffers the ATM cells continuously input from the input/output interfaces 440a to 440d as shown in FIG. 8A and further adds an input port identifier to each of the ATM cells as the HEC as indicated by the symbol "b" in FIG. 8C.

The header extraction and address conversion memory interface unit 422 extracts the VPI/VCI from the header of the ATM cell and the input port identifier from the HEC of the header and outputs the same to the address translation memory unit 424.

The address translation memory unit 424 searches through the table (FIG. 5) based on the VPI/VCI and the input port identifier input from the header extraction and address conversion memory interface unit 422 to further generate the VPI'/VCI' and the routing information.

The header extraction and address conversion memory interface unit 422 uses the VPI'/VCI' generated by the address translation memory unit 424 to replace the original VPI/VCI and further adds the routing information to the ATM cell as the HEC.

The output control unit 426 allocates the ATM cells to the input/output interfaces 440a to 440d based on the routing information added to the ATM cells as the HEC and outputs the same to the input/output interfaces 440a to 440d via the output buffer 438. Note that, the output buffer 438 buffers the ATM cells from the output control unit 426 for each priority order for every input/output port, therefore it is not necessary to add special control data to the HEC.

The input/output interfaces 440a to 440d output the continuous ATM cells input from the output control unit 426 as shown in FIG. 8A to the ATM terminals.

As explained above, according to the modification of the operation of the ATM exchange 3 (FIG. 6) in the fourth embodiment, in the ATM exchange, the redundant communication processing time can be eliminated, and the exchange of the ATM cells can be carried out at a high speed.

Note that, in the fourth embodiment, a modification of the operation of the ATM exchange 3 was shown, but the operation of the ATM exchange 2 (FIG. 4) can be similarly modified.

Further, other than the input port identifier etc., any data of one byte at the maximum can be added to the HEC.

The ATM exchanges 1 to 3 (FIG. 1, FIG. 4, FIG. 6) explained in the first embodiment to the fourth embodiment require that the communication nodes of a plurality of transmission rates be connected via the same communication medium.

However, for the transmission rates of communication nodes connectable by using an unshielded twisted pair cable (UTP) as the communication medium, there are three types, that is, 155.52 Mbps, 51.84 Mbps, and 25.6 Mbps (note, 32 Mbps on the communication medium).

Further, when introducing the ATM exchanges 1 to 3 into the home, there is a possibility that not only will the transmission rates of the ATM exchanges 1 to 3 be different, but also a communication node carrying out communication with the protocol of another communication system of the ATM system will be connected via the same communication medium. However, when introducing the ATM exchanges 1 to 3 into homes, the user of the general home, who is not skilled in the handling of the ATM exchange, has to connect the communication node and the ATM exchange, so there to a high possibility of an occurrence of erroneous wiring.

In the fifth embodiment, an explanation will be made of the ATM exchange 4 constituted so that erroneous wiring does not occur even if a user not skilled in the handling of the ATM exchange connects the communication node by improving the ATM exchanges 1 to 3 from such a viewpoint.

Figure 9:
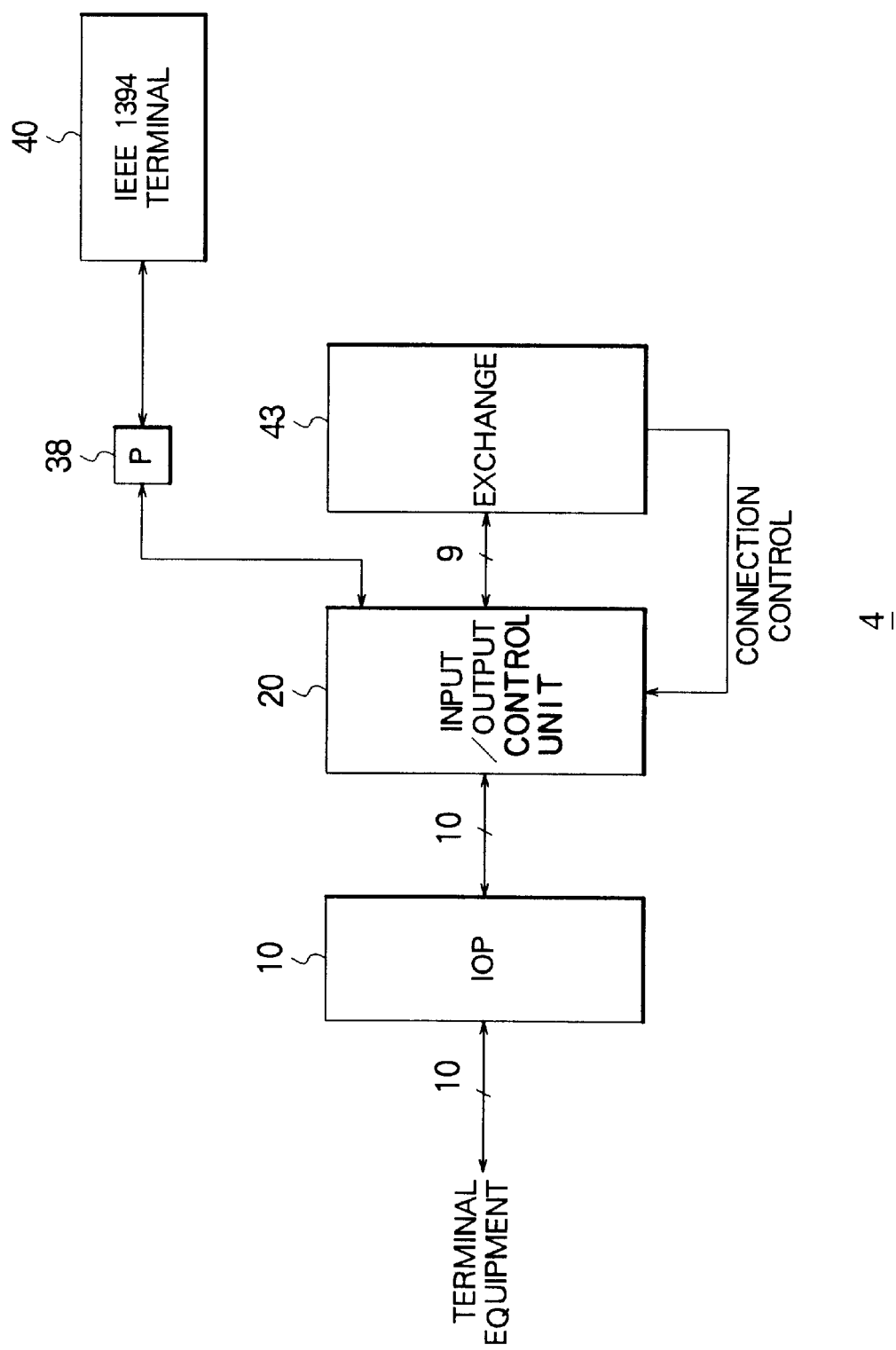
FIG. 9 is a view of the configuration of an ATM exchange apparatus according to the present invention.

FIG. 9 is a view of the configuration of the ATM exchange 4 according to the present invention. Note that, in FIG. 9 etc., the same references are given to the same constituent parts as those of the ATM exchanges 1 to 3 (FIG. 1, FIG. 4, and FIG. 6).

The ATM exchange 4 is a small scale apparatus to be provided in the home similar to the ATM exchanges 1 to 3 and, as shown in FIG. 9, is constituted by an input/output port unit (IOP) 10, an input/output control unit 20, an exchange unit 43, and a non-ATM input/output port (P) 38. The non-ATM terminal (IEEE1349) 40 is connected to it.

The ATM exchange 4 carries out the exchange processing of the ATM cells among terminal equipment (communication nodes) having the transmission rates of 155.52 (155) Mbps, 51.84 (52) Mbps, and 25.6 Mbps physically connected to the input/output port unit 10 by the same cable [for example UTP and POF (plastic optical fiber)] and the same connector, and further connects the non-ATM cell communication nodes carrying out the data transmission by a communication system other than the ATM system, for example IEEE1394.

Figure 10:
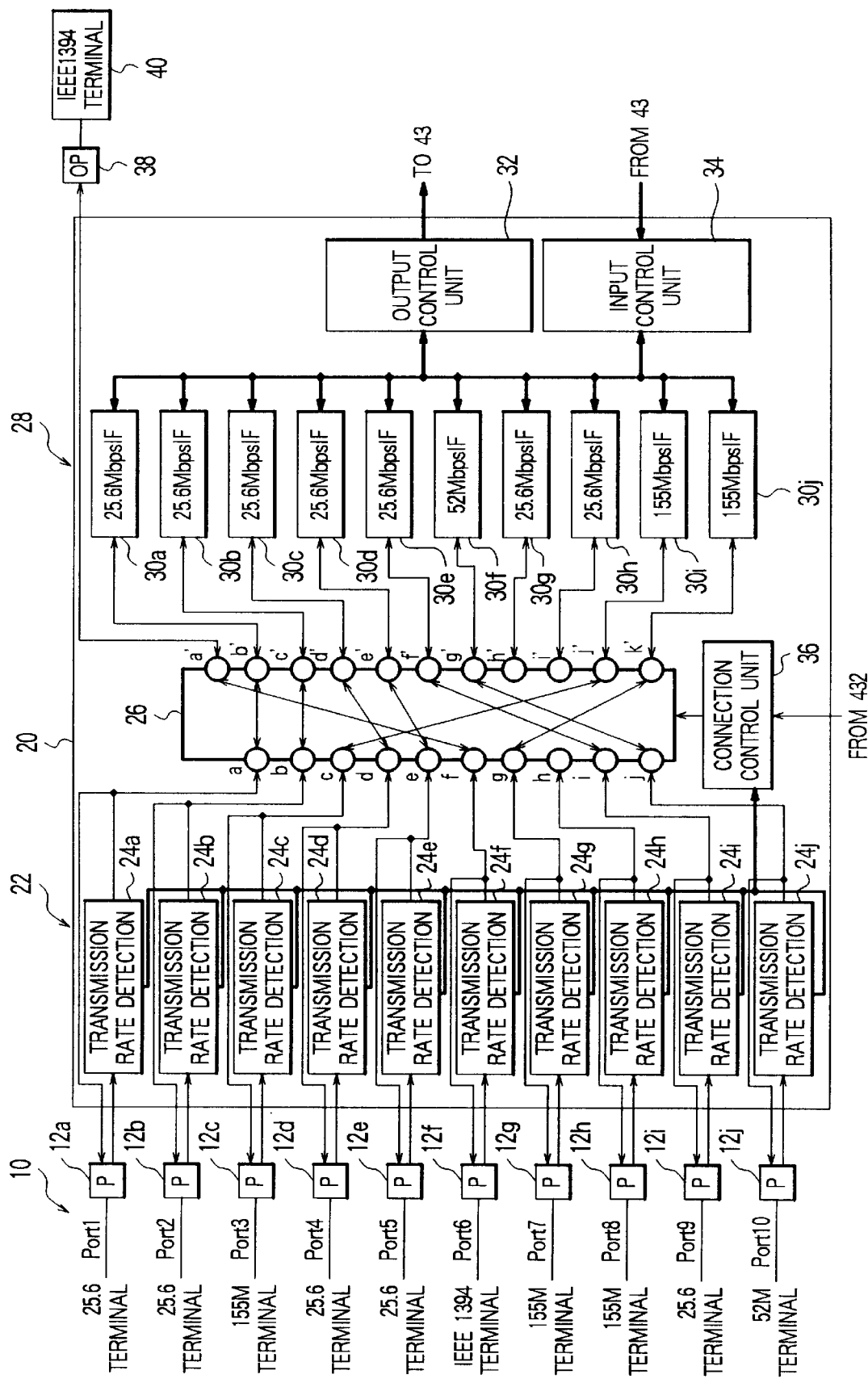
FIG. 10 is a view illustrating the configuration of an input/output port unit and an input/output control unit of the ATM exchange shown in FIG. 9.

FIG. 10 is a view illustrating the configuration of the input/output port unit 10 and input/output control unit 20 of the ATM exchange 4 shown in FIG. 9.

As shown in FIG. 10, the input/output port unit 10 is constituted by input/output ports (P) 12a to 12j; the input/output control unit 20 is constituted by a transmission rate detection unit 22, a connection switch 26, an interface unit 28, an output control unit 32, an input control unit 34, and a connection control unit 36; the transmission rate detection unit 22 is constituted by transmission rate detection circuits 24a to 24j; and the interface unit 28 is constituted by interface (IF) circuits 30a to 30j.

Figure 11:
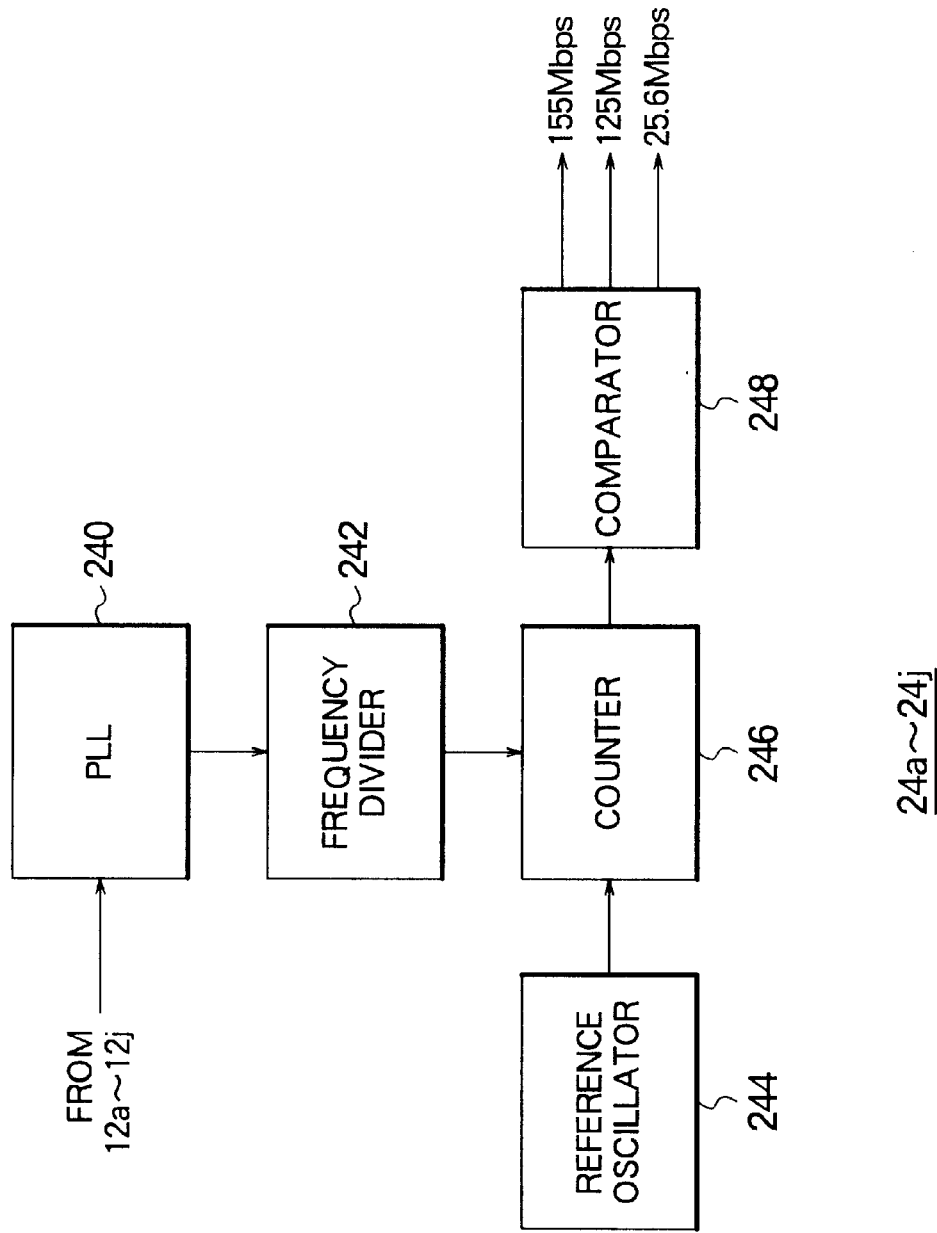
FIG. 11 is a view of the configuration of a part for detecting the transmission rate in the transmission rate detection circuit shown in FIG. 10.

FIG. 11 is a view of the configuration of the part for detecting the transmission rate among the transmission rate detection circuits 24a to 24j shown in FIG. 10.

As shown in FIG. 11, each of the transmission rate detection circuits 24a to 24j is constituted by a PLL circuit 240, a frequency divider 242, a reference oscillator 244, a counter circuit 246, and a comparator 248.

Figure 12:
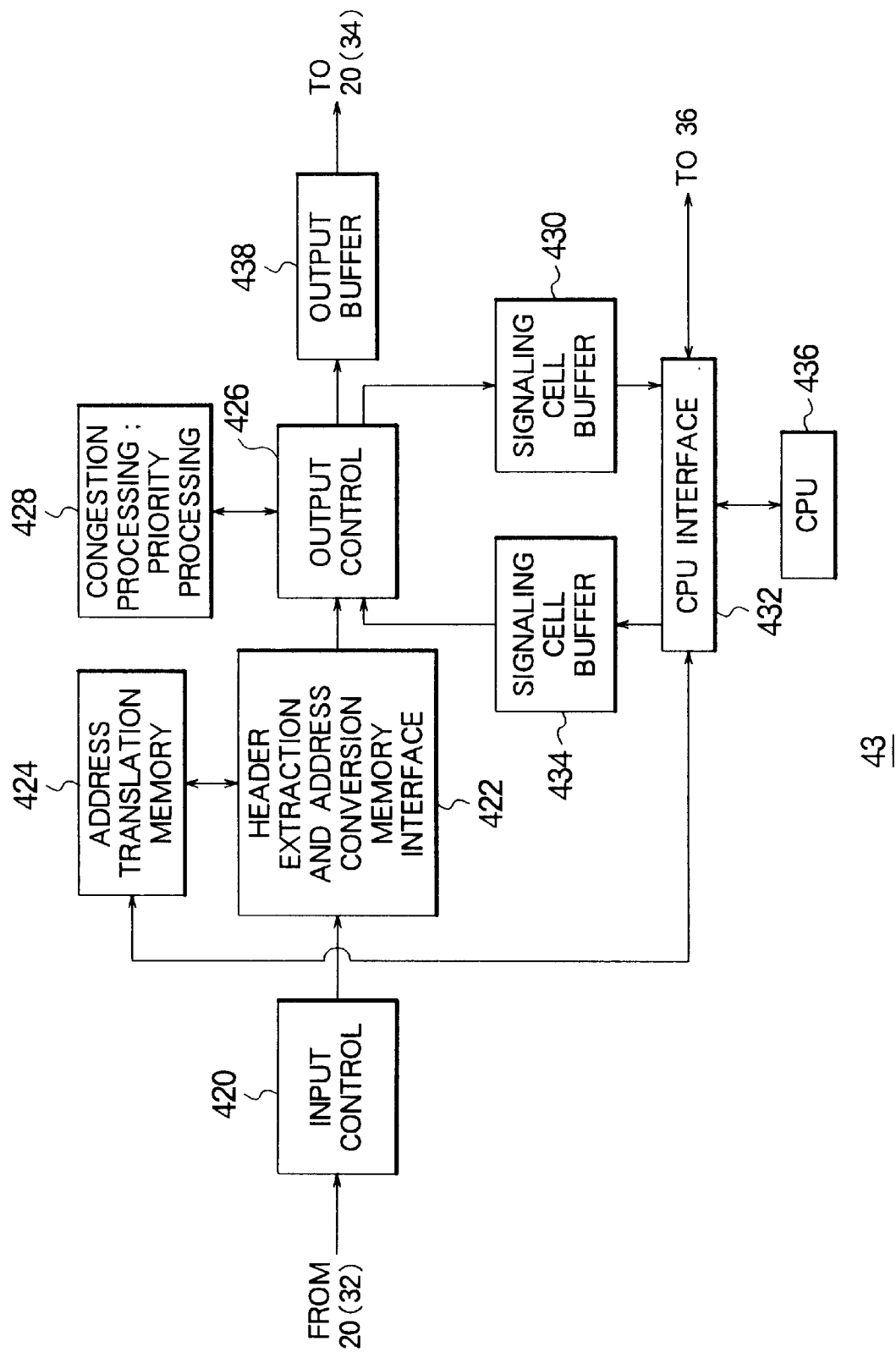
FIG. 12 is a view of the configuration of the exchange unit of the ATM exchange shown in FIG. 9.

FIG. 12 is a view of the configuration of the exchange unit 43 of the ATM exchange 4 shown in FIG. 9. Note that, in FIG. 12, the same references are given to the same constituent parts as those of the ATM exchanges 1 to 3 (FIG. 1, FIG. 4, and FIG. 6).

As shown in FIG. 12, the exchange unit 43 is a modification of the exchange unit 42 (FIG. 6) explained in the third embodiment and is constituted by an input control unit 420, header extraction and address conversion memory interface unit 422, output control unit 426, congestion processing and priority processing unit 428, signaling cell buffers 430 and 434, CPU interface 432, a control unit 436 containing a microprocessor (CPU), memory, and peripheral circuits of the same, and an output buffer 438.

Below, the constituent parts of the ATM exchange 4 will be explained.

In the input/output port unit 10 (FIG. 9, FIG. 10), the input/output ports 12a to 12j (FIG. 10) have connected to them, by the same communication medium and connector, for example, ATM system terminal equipment (ATM terminals) having transmission rates of 25.6 Mbps, 25.6 Mbps, 155 Mbps, 25.6 Mbps, and 25.6 Mbps, a non-ATM system terminal equipment (non-ATM terminal) of the IEEE1394 system, and ATM terminals of transmission rates of 155 Mbps, 155 Mbps, 25.6 Mbps, and 52 Mbps, respectively.

The input/output ports 12a to 12j reproduce the transmission data of the ATM cells and non-ATM system from the transmission signals input from the connected terminal equipment and output the same to the transmission rate detection unit 22 and the input terminals "a" to "j" of the connection switch 26. Further, the input/output ports 12a to 12j convert the transmission data of the ATM cells and non-ATM system input from the input terminals "a" to "j" of the connection switch 26 to transmission signals suited to the communication medium so as to transmit the same.

In the transmission rate detection unit 22 of the input/output control unit 20, the transmission rate detection circuits 24a to 24j identify the transmission rates of the data input from the input/output ports 12a to 12j and thereby detect the communication system of the data input from the input/output ports 12a to 12j and notify the same to the connection control unit 36. That is, in contrast to the fact that the transmission rate of the IEEE1394 system is 125 Mbps, the transmission rates of the ATM system are 25.6 Mbps, 52 Mbps, and 155 Mbps, therefore by detecting the transmission rate, the transmission rate detection circuits 24a to 24j can identify whether the data being input is the data of the ATM system or the IEEE1394 system. Note that, the transmission rate detection circuits 24a to 24j detect the transmission rates of the data input from the input/output ports 12a to 12j as will be explained below and notify the same to the connection control unit 36.

The PLL circuit 240 (FIG. 11) generates a clock signal in synchronization with the data input from the input/output ports 12a to 12j and outputs the same to the frequency divider 242.

The frequency divider 242 generates a frequency-divided signal by dividing by m (m is an integer) the frequency of the circuit 241 generated by the PLL circuit 240 and outputs the same to the counter circuit 246.

The reference oscillator 244 generates a reference clock signal of a constant cycle and outputs the same to the counter circuit 246.

The counter circuit 246 counts the reference clock signal input from the reference oscillator 244 and the frequency-divided signal input from the frequency divider 242 for every cycle and outputs the count to the comparator 248.

The comparator 248 compares the count of the counter circuit 246 with reference values $S_1$, $S_2$, and $S_3$. When the count of the counter circuit 264 is within a predetermined range of error from each of the reference values $S_1$, $S_2$, and $S_3$, it decides that the data input from the input/output ports 12a to 12j has the transmission rates of 155 Mbps, 52 Mbps, and 25.6 Mbps and outputs the result of the decision to the connection control unit 36. Where the count of the counter circuit 246 is out of the predetermined range of error from each of the reference values $S_1$, $S_2$, and $S_3$, it outputs this to the connection control unit 36.

In the interface unit 28, the interface circuits 30a to 30j are devices for processing so-called transmission convergence sub layers of the ATM system having transmission rates of 25.6 Mbps, 25.6 Mbps, 25.6 Mbps, 25.6 Mbps, 25.6 Mbps, 52 Mbps, 25.6 Mbps, 25.6 Mbps, 155 Mbps, and 155 Mbps, respectively. The interface circuits 30a to 30j carry out the input/output processing with respect to the ATM cells input and output between the input/output terminals b' to k' of for example the connection switch 26 and the output control unit 32 and the input control unit 34 and carry out processing for conversion to data in units of ATM cells from the serial bit stream.

That is, the interface circuits 30a to 30j respectively convert the ATM cells of cell units input from the exchange unit 43 via the input control unit 34 to the ATM data of a serial format having transmission rates of 25.6 Mbps, 25.6 Mbps, 25.6 Mbps, 25.6 Mbps, 25.6 Mbps, 52 Mbps, 25.6 Mbps, 25.6 Mbps, 155 Mbps, and 155 Mbps and output the same to the input/output terminals b' to k' of the connection switch 26.

Further, the interface circuits 30a to 30j respectively convert the ATM cells of the serial format input from the input/output terminals b' to k' of the connection switch 26 input with the transmission rates of 25.6 Mbps, 25.6 Mbps, 25.6 Mbps, 25.6 Mbps, 25.6 Mbps, 52 Mbps, 25.6 Mbps, 25.6 Mbps, 155 Mbps, and 155 Mbps to the ATM cells of cell units and output the same to the exchange unit 43 via the output control unit 32.

The non-ATM terminal 40 is the terminal equipment of for example the IEEE1394 system and carries out the data transmission by a communication system other than the ATM system.

The non-ATM input/output port 38 carries out the interface processing between the non-ATM terminal 40 and the input/output terminal a' of the connection switch 26 similar to the input/output ports 12a to 12j and inputs and outputs the non-ATM transmission data.

The connection switch 26 connects the input/output terminals "a" to "j" and the input/output terminals a' to j' according to the control of the connection control unit 36 and transmits the transmission data of ATM cells and the non-ATM system in two directions between the input/output terminals "a" to "j" and the input/output terminals a' to j'.

The connection control unit 36 connects the input/output ports 12a to 12j and the interface circuits 30a to 30j by controlling the connection switch 26 based on the transmission rate and communication system of the data input from the input/output ports 12a to 12j notified from the transmission rate detection circuits 24a to 24j, respectively.

Note that, in the example shown in FIG. 10, the input/output ports 12a to 12j have connected to them ATM terminals having the transmission rates of 25.6 Mbps, 25.6 Mbps, 155 Mbps, 25.6 Mbps, and 25.6 Mbps, the non-ATM terminal of the IEEE1394 system, and the ATM terminals having the transmission rates of 155 Mbps, 155 Mbps, 25.6 Mbps, and 52 Mbps, therefore the connection control unit 36 controls the connection switch 26 and connects the input/output terminals "a" to "j" and the input/output terminals b', c', j', d', e', a', k', NC, f', and g' respectively [note, NC (no contact) indicates a connection to nowhere].

Where there are no interface circuits 30a to 30j suited to the terminal equipment connected to the input/output ports 12a to 12j (refer to the input/output port 12h) or they cannot be used due to breakdown, the connection control unit 36 notifies this to the control unit 436 of the exchange unit 43 and further displays this on for example the operation terminal (not illustrated) connected to the ATM exchange 4 or turns on an alarm lamp (not illustrated) provided in the housing of the ATM exchange 4 to notify the same to the user of the ATM exchange 4.

The output control unit 32 multiplexes the ATM cells input from the interface circuits 30a to 30j and outputs the same to the exchange unit 43 and further notifies the input control unit 420 (FIG. 12) of the exchange unit 43 of information indicating the output of the ATM cells from the interface circuits 30a to 30j.

The input control unit 34 demultiplexes the ATM cells which were multiplexed by the output control unit 426 and input via the output buffer 438 where there is a notification indicating the output of the ATM cells from the output control unit 426 of the exchange unit 43 and outputs the same to the interface circuits 30a to 30j.

In the exchange unit 43 (FIG. 12), the input control unit 420 demultiplexes the ATM cells multiplexed by the output control unit 32 where there is a notification indicating the output of the ATM cells from the output control unit 32 (FIG. 10) of the input/output control unit 20 and buffers this and outputs the same to the header extraction and address conversion memory interface unit 422 together with the identifier (IF identifier) indicating the input/output ports 12a to 12j receiving the demultiplexed ATM cells. Note that, the IF identifier in the ATM exchange 4 corresponds to the input port identifier in the ATM exchanges 2 and 3 (FIG. 4 and FIG. 6) shown in the second embodiment and the third embodiment.

The header extraction and address conversion memory interface unit 422 extracts the virtual path identifier (VPI), virtual channel identifier (VCI), and IF identifier contained in the header part of an ATM cell input from the input control unit 420 and outputs the same to the address translation memory unit 424. Further, the header extraction and address conversion memory interface unit 422 uses the new virtual path identifier and virtual channel identifier (VPI'/VCI') input from the address translation memory unit 424 to replace the original VPI/VCI and further adds the routing information and identifier of the priority control etc. as for example the header error control information (HEC) of the header of the ATM cell and outputs the result to the output control unit 426.

The address translation memory unit 424 translates the VPI/VCI and the IF identifier input from the header extraction and address conversion memory interface unit 422 in the same way as the ATM exchange 3 (FIG. 6) to generate a now VPI'/VCI' and routing information and outputs the same to the header extraction and address conversion memory interface unit 422.

Further, the address translation memory unit 424 generates the identifier which is input from the control unit 436 via the CPU interface 432 and used for the priority control and congestion control with respect to the ATM cells and the identifier indicating the input/output ports 12a to 12j receiving the ATM cells etc. according to need and outputs the same to the header extraction and address conversion memory interface unit 422.

Note that, where a signaling cell used for the call set-up processing is input from the input/output control unit 20, the address translation memory unit 424 generates the VPI'/VCI' so that the signaling cell is routed in the signaling cell buffer 430.

The output control unit 426 allocates the ATM cells input from the header extraction and address conversion memory interface unit 422 to the input/output ports 12a to 12j based on the routing information and further carries out the priority control and congestion control based on the identifiers added to the ATM cells and multiplexes and outputs the same to the input control unit 34 of the input/output control unit 20 via the output buffer 438.

Note that, where a signaling cell for the call set-up is input from the header extraction and address conversion memory interface unit 422, the output control unit 426 outputs the signaling cell via the signaling cell buffer 430 and the CPU interface 432 to the control unit 436.

The control unit 436 carries out the addition, deletion, and updating of the storage contents (entry) of the address translation memory unit 424 based on the call set-up information contained in the signaling cell input via the signaling cell buffer 430 and the CPU interface 432.

Further, the control unit 436 generates a signaling cell for call set-up according to need and outputs the same to the output control unit 426 via the CPU interface 432 and the signaling cell buffer 434.

Below, the operation of the ATM exchange 4 will be explained.

When for example ATM terminals having transmission rates of 25.6 Mbps, 25.6 Mbps, 155 Mbps, 25.6 Mbps, and 25.6 Mbps, a non-ATM terminal of the IEEE1394 system, and ATM terminals having the transmission rates of 155 Mbps, 155 Mbps, 25.6 Mbps, and 52 Mbps are connected to the input/output ports 12a to 12j of the input/output port unit 10 (FIG. 10) via the UTP or POF, respectively, the transmission rate detection circuits 24a to 24j of the input/output control unit 20 receive the data from the terminal equipment via the input/output ports 12a to 12j, respectively and detect the transmission rates of the terminal equipment.

The connection control unit 36 controls the connection switch 26 based on the transmission rates of the terminal equipment detected by the transmission rate detection circuits 24a to 24j and connects the terminal equipment to the interface circuits 30a to 30j and non-ATM input/output port 38 with the suitable transmission rates as shown in FIG. 10.

The interface circuits 30a to 30j receive the ATM cells input from the input/output ports 12a to 12j, respectively, and output the same to the exchange unit 43 (FIG. 12) via the output control unit 32.

The exchange unit 43 generates the routing information based on the VPI/VCI and IF identifier of the header of each of the ATM cells, allocates the ATM cells to the interface circuits 30a to 30j, carries out the exchange processing, and outputs the same to the input control unit 34 of the input/output control unit 20.

The input control unit 34 (FIG. 10) demultiplexes the ATM cells input from the exchange unit 43 and outputs the same to the interface circuits 30a to 30j.

The interface circuits 30a to 30j transmit the ATM cells input from the input control unit 34 to the ATM terminals via the connection switch 26 and the input/output ports 12a to 12j.

On the other hand, the non-ATM terminal connected to the input/output port 12f transmits and receives the transmission data with the non-ATM terminal 40 via the input/output port 12f the connection switch 26, and the non-ATM input/output port 38.

As explained above, the ATM exchange apparatus 1 according to the present invention does not require a change of the wiring on the exchange side even if a plurality of terminals having different transmission rates are connected.

Further, where the interface circuits 30a to 30j suited to the terminal equipment to be connected cannot be used, the ATM exchange 4 according to the present invention can notify this fact to the user to prompt the user to take suitable action.

Further, even if the terminal equipment having different communication systems is connected to the ATM exchange 4 according to the present invention, it is not necessary to change the wiring inside the ATM exchange 4.

Note that, in the transmission rate detection circuits 24a to 24j, where there is a sufficient difference of the transmission rates of the terminal equipment, a high precision is not required for the processing for detection of the transmission rate, therefore, in place of the PLL circuit 240, a simpler circuit such as an f-V conversion circuit can be used.

Further, in the ATM exchange 4, the communication terminal was connected to the input/output port, but for example, it is also possible to constitute the ATM exchange by separately providing the input ports 52a to 52j of the input/output port unit 50 from the output ports as in the ATM exchange 5 shown in FIG. 13, and further separately providing the interface circuits 30a to 30j for the input and output. Further, in this case, the number of the input ports and the number of the output ports may be different.

Further, the number of the input/output ports 12a to 12j (n) and the number of the interface circuits 30a to 30j (m) do not always have to be the same, and n can be made larger than m assuming that all of the ports will not simultaneously operate due to the increase of the number of the input/output ports. Conversely, all input/output ports can deal with various transmission rates, therefore it is also possible to make n smaller than m.

Further, it to also possible to constitute an interface circuit connected to a public network or other interface circuit used for a predetermined purpose to be directly connectable with a dedicated path not going through the connection switch 26.

Further, in the same way as the ATM exchange 1 (FIG. 1), it is also possible to constitute the ATM exchange 4 so that the routing is carried out by providing translation memories individually corresponding to the input/output ports 12a to 12j.

Further, as shown in the fourth embodiment, it is also possible to constitute the ATM exchange 4 so that the input port identifier etc. is added to the header of the ATM cell as the HEC.

As explained above, according to the ATM exchange apparatus of the present invention and the method of same, the routing processing and the congestion control and priority control processing etc. can be carried out without insertion of control data into the train of continuous ATM cells and in addition the processing can be carried out easily and at a high speed.

Further, according to the ATM exchange apparatus of the present invention and the method of same, even in a case where ATM cells containing data for which the real time and high speed exchange processing are required, for example, video data, are exchanged, it is not necessary to raise the frequency of the clock of the ATM exchange or increase the bus width.

Further, according to the ATM exchange apparatus of the present invention and the method of same, an efficient exchange of the ATM cells can be carried out without a lowering of the processing capability of the entire ATM exchange due to processing in one part of the ATM exchange.

What is claimed is:

1. An exchange apparatus for processing data transmitted in units of a plurality of packets over a communication line, comprising:

control data adding means for adding predetermined control data at a position of header error control data included in a header region of each of said plurality of packets; and exchange processing means for performing exchange processing with respect to one of said plurality of packets transmitted based on said predetermined control data, wherein said plurality of packets are input from a plurality of input ports and said control data adding means adds an input port identifier indicating a specific one of said plurality of input ports from which a corresponding one of said plurality of packets was input at said position of the header error control data as said predetermined control data.

2. The exchange apparatus as set forth in claim 1, further comprising:

a translation memory which for storing a plurality of virtual path identifiers, a plurality of virtual channel identifiers, a plurality of new virtual path identifiers, a plurality of new virtual channel identifiers, and routing information in corresponding sets and for referring to one of said plurality of virtual path identifiers, one of said plurality of virtual channel identifiers, and said input port identifier included at said position of said header error control data of one of said plurality of packets for performing translation processing using said translation memory.

3. The exchange apparatus as set forth in claim 1, wherein said exchange processing means comprises a routing means for routing one of said plurality of packets to one of a plurality of output ports based on an address included in the header region of said one of said plurality of packets and said input port identifier added as said header error control data.

4. The exchange apparatus as set forth in claim 3, further comprising:
   output port control data adding means for adding to each of said plurality of packets routed by said routing means an output port identifier indicating a specific one of said plurality of output ports for outputting a corresponding one of said plurality of packets as the header error control data of said one of said plurality of packets; and
   asynchronous transfer mode cell exchanging means for exchanging each of said plurality of packets and for outputting each of said plurality of packets from said one of said plurality of output ports indicated by said output port identifier added as said header error control data of one of said plurality of packets.

5. The exchange apparatus as set forth in claim 3, wherein said address is a virtual path identifier and a virtual channel identifier and a new virtual path identifier and a new virtual channel identifier.

6. The exchange apparatus as set forth in claim 4, wherein said control data adding means further adds to each of the plurality of packets input from said plurality of input ports a predetermined identifier used for congestion processing and priority processing as the header error control data, and said exchange processing means includes congestion and priority processing means for performing one of said congestion processing and said priority processing with respect to one of said plurality of packets based on said predetermined identifier added as the header error control data.

7. An exchange method for processing data transmitted in units of a plurality of packets over a communication line, comprising the steps of:
   adding predetermined control data at a position of header error control data included in a header region of each of said plurality of packets;
   performing exchange processing with respect to one of said plurality of packets transmitted based on said predetermined control data;
   inputting said plurality of packets from a plurality of input ports; and
   adding an input port identifier indicating a specific one of said plurality of input ports from which a corresponding one of said plurality of packets was input at said position of said header error control data as said predetermined control data.

8. The exchange method as set forth in claim 7, further comprising the steps of:
   using a translation memory in which are entered and stored a plurality of virtual path identifiers, a plurality of virtual channel identifiers, a plurality of new virtual path identifiers, a plurality of new virtual channel identifiers, and routing information in corresponding sets; and
   referring to one of said plurality of virtual path identifiers, one of said plurality of virtual channel identifiers, and said input port identifier included at said position of said header error control data of one of said plurality of packets for performing translation processing using said translation memory.

9. The exchange method as set forth in claim 7, further comprising the steps of:
   routing by said exchange processing one of said plurality of packets to one of a plurality of output ports based on an address included in said header region of said one of said plurality of packets; and
   adding said input port identifier as said header error control data.

10. The exchange method as set forth in claim 9, further comprising the steps of:
    adding to each of said plurality of packets routed by said exchange processing an output port identifier indicating a specific one of said plurality of output ports for outputting a corresponding one of said plurality of packets as said header error control data of one of said plurality of packets; and
    exchanging each of the plurality of packets and outputting each of said plurality of packets from one of said plurality of output ports indicated by the output port identifier added as said header error control data of one of said plurality of packets.

11. The exchange method as set forth in claim 9, wherein said address is a virtual path identifier and a virtual channel identifier and a new virtual path identifier and a new virtual channel identifier.

12. The exchange method as set forth in claim 10, further comprising the steps of:
    adding to each of the plurality of packets input from said plurality of input ports a predetermined identifier used for congestion processing and priority processing as said header error control data; and
    performing one of said congestion processing and said priority processing with respect to one of said plurality of packets routed by said exchange processing based on said predetermined identifier added as said header error control data.

* * * * *